Patented May 6, 1941

2,240,518

UNITED STATES PATENT OFFICE 2,240,518

TREATMENT OF ANIMAL TISSUE

John M. Ramsbottom, Chicago, Ill., assignor to Industrial Patents Corporation, Chicago, Ill., a corporation of Delaware No Drawing. Application December 15, 1939, Serial No. 309,348. In Canada September 24, 1938

20 Claims. (Cl. 99—107)

This invention relates to a method of treating animal tissue, and particularly those tissues such as the flesh and the intestines.

This application is a continuation in part of my application entitled Treatment of animal tissue, Serial No. 224,401, filed August 11, 1938.

One of the objects of this invention is to provide a method whereby animal tissue may be rendered tender.

Another object of this invention is to provide a method whereby the flesh of edible animal carcasses may be rendered tender.

Another object of this invention is to provide a method whereby the tenderness of fresh meat may be improved without in any way altering or detracting from other desirable qualities of the meat.

Another object of this invention is to provide a method whereby animal intestines may be rendered tender and more adaptable for use as sausage casings.

Another object of the invention is to provide a method whereby such tough casings as hog casings and Indian sheep casings may be tendered to any desired extent and rendered useful in the manufacture of high grade sausage products which require a tender casing.

Other objects of this invention will be apparent from the description and claims which follow.

It will be understood that this invention is applicable to all types and varieties of animal tissue. However, by way of illustration and not by way of limitation, the invention will be discussed as specifically embodied in the treatment of fresh beef, hog casings, Indian sheep casings, and beef casings.

As is well known, cuts of beef from certain parts of the animal command a higher price on the market than cuts of other portions of the carcass, chiefly because the higher priced cuts are more tender in that these cuts are found to present the minimum resistance to chewing effort.

The problem of grading beef is very largely one of ascertaining by trained observers the probable tenderness of a given carcass or cut of beef.

It is customary in preparing beef of high grade for particularly fastidious consumers to age the beef, that is, to carry the beef under refrigeration for a sufficient length of time to permit the enzymes naturally present in the beef to bring about a noticeable tendering effect. It is necessary, of course, that this aging process be carried on with carefully controlled refrigeration to avoid decomposition. If the aging process is carried on with humidities near 100 per cent, the product becomes moldy to such a degree that appreciable losses are incurred by reason of trimming to remove the mold. If the humidity in the aging refrigerator is kept low enough to prevent mold growth, the surface portions of the carcasses become desiccated, resulting in evaporation loss and the trimming loss necessary to eliminate the desiccated portions.

By the process of the present invention, the desirable results attendant to normal aging are secured without the lapse of time required by normal aging and without the attendant difficulties of mold growth on the one hand or desiccation on the other. By the present invention, tenderness of high quality meats may be improved; and average or mediocre meats may be brought to a degree of tenderness equal to that commonly found in the higher quality beef.

Natural casings, as distinguished from artificial or synthetic casings, are prepared from the intestines of edible animals, such as cattle, swine, and sheep. After the set is removed from the carcass, food, manure, and other matter in the intestine is removed by means of conventional stripping rollers. Thereafter, by appropriate means, the gut slimes within the casing are broken down and removed. The product resulting from such treatment is a tubular membrane appropriate for sausage casings.

Sheep casings command a high price because of the fact that they are exceptionally tender and may be readily eaten with the sausage. High grade frankfurters and fresh pork sausage are conventionally prepared with sheep casings.

Hog casings are suited for the manufacture of frankfurters and other sausages similar in size, but due to the toughness of hog casings, they can not be successfully used in the manufacture of fresh pork sausage and may be used only in the manufacture of the lower grade frankfurters because the casing is objectionable to the consumer, being difficult to masticate. The same is true of Indian sheep casings. Similarly, beef casings are too tough for convenient consumption and are normally removed by the consumer before the sausage is eaten.

The present invention contemplates the treatment of animal tissue with an extract from the Osage orange tree (*Maclura pomifera*), or an aqueous solution of the proteolytic enzyme present in this extract.

The extract may be obtained by pressing juice from the fruit or from the fresh leaves, stems, and roots of the tree. The resulting juice is a white milk-like liquid having a pH value of about 6.0. The pH value varies with the source of the juice. A precipitate may be obtained from this juice by the usual methods used in isolating proteolytic enzymes, such as by treatment with six volumes of ethyl alcohol, precipitation with acetone, methyl alcohol, salts, and the like, or by methods which include adsorption and elution. Although no reference in the literature can be found, it is believed that the precipitate so obtained is a proteolytic enzyme, which I have designated as macin.

In the use of a solution of macin, it has been found that macin is most active when employed in a solution having a hydrogen ion concentration which approximates that of the juice extracted from the Osage orange, or parts of the Osage orange tree. However, macin is active when used in solutions having a hydrogen ion concentration corresponding to a pH of 4 to 8.

Cuts of meat, for example, beef steak cuts, may be treated by applying the solution of the Osage orange juice or a dilute solution of macin to the surface of the cut. In commercial practice of the present invention, Osage orange juice or a dilute solution of macin may be diffused through a carcass, or a portion of a carcass, by injecting the solution into the arterial system of the carcass under sufficient pressure to force the solution into the extending capillaries and then holding the meat under refrigeration sufficiently low to avoid spoilage until it is prepared for consumption. By utilizing the vascular system for obtaining contact between the macin and the individual tissues of the meat I am enabled to treat any single portion of the carcass without affecting the remaining portions. This is done by dissecting out the end of any main artery or blood vessel leading to a particular portion of the carcass which it is desired to treat, the dilute macin solution being injected into the selected blood vessel. If it is desired to treat the entire carcass, the injection of the dilute macin solution can be made into the arteries leading from the heart.

In carrying out my invention, where it is desired to treat the entire carcass, the animal is slaughtered in the usual manner, that is, ordinarily stunned and bled to eliminate the major portion of the blood and serum from the tissues and blood vessels. The animal is then hung up and dressed by removing the skin, head, and entrails. Prior to the removal of the entrails, in the practice of my invention, an incision is made to expose the heart and render the aorta artery accessible. The arteries leading from the heart are connected with a line containing a dilute aqueous solution of macin or Osage orange juice under pressure and the dilute macin is forced throughout the vascular system through the arteries and the capillaries to the meat tissues. An alternative method consists of cutting off the lower end of the heart and injecting the fluid under pressure into the left ventricle.

An aqueous solution containing from 10 to 25 per cent Osage orange juice will materially improve the tenderness of meat. An aqueous solution of macin containing approximately 0.015 per cent macin may also be used. These solutions when injected into the circulatory system of a meat cut or a carcass in an amount equal to about 6 per cent of the weight of the meat, will materially improve the tenderness of the meat.

It is apparent that the aging of meat is not merely a factor of the length of the aging period but is dependent upon the enzymatic action during the aging period. My invention provides a method of accelerating the aging of animal tissue.

In the treatment of sausage casings, the Osage orange juice or a solution of macin may be applied to the casing in any suitable manner as by washing or soaking the casing in the solution, adding macin or Osage orange juice to the sausage cook water, or spraying, dipping, or wiping the casing with the macin solution or Osage orange juice after the casing has been stuffed with sausage meat.

The treated casing is heated to a temperature between about 60 degrees and 140 degrees F. and maintained at such temperature for a sufficient length of time to permit the enzyme to attack the tissue. The temperature is then raised to a point high enough, for example, to a temperature between about 165 degrees and 175 degrees F. to destroy the major portion of the enzyme and avoid excessive action on the casing.

The invention may be satisfactorily practiced by dipping or spraying the stuffed casing with a solution of Osage orange juice containing 10 to 25 per cent juice or with an aqueous solution of macin containing about 0.015 per cent macin. The concentration of the solution used will vary with the type of casing which it is desired to tender.

It will be understood, of course, that the time of treatment, the temperature of treatment, and the concentration of the solution are all variable and may be adjusted at will to secure the desired extent of tendering, which is dependent upon the initial toughness of the animal tissue. The activity of macin increases with increasing temperature until an optimum condition is reached at temperatures between 140 degrees and 160 degrees F. The activity of macin is destroyed at temperatures between 165 degrees and 175 degrees F.

A preferred procedure in carrying out the present invention requires two basins or receptacles located at the end of a conventional stuffing table. One basin is equipped with an overflow, and warm water is passed continuously through the basin. The other basin serves as a receptacle for holding a solution of macin or a solution of Osage orange juice.

The Osage orange juice solution may be prepared from fresh or frozen Osage orange juice, but the juice must not have been subjected to a temperature sufficiently high to destroy its enzymatic action.

A satisfactory solution may be prepared of from one to two and one-half parts of Osage orange juice to one part of water by volume, or by preparing an aqueous solution of macin containing about 0.015 per cent macin. The prepared solution is then placed in the Osage orange juice receptacle. After the sausages, such as frankfurters, are stuffed and linked in the usual manner, the operator picks up the linked sausages and dips them in the warm water running basin, immersing the frankfurters up and down three times to rinse off particles of meat and the like. The operator then immerses the frankfurters in the Osage orange juice solution or the solution of macin, care being taken to have the solution reach every portion of the outside surface of the casing.

The product is then held in a tempering room for a period of about one hour and thirty minutes with an air temperature of 90 degrees F. and a relative humidity of 80 to 85 per cent. The product is then removed to a preheated smoke house with temperatures raised sufficiently high to cook the product and destroy the enzyme, being subjected to the cooking temperatures for about forty-five minutes to one hour, after which the product is subjected to higher temperatures in the presence of steam. If desired, the product may be cooked in water, in which case it is preferable not to exceed a temperature of 170 degrees F.

The foregoing treatment not only results in producing animal tissues which are more tender, but the physical characteristics, including the smoking properties, are improved. With particular reference to casings, treatment thereof in accordance with the present invention also results in an increased translucency. The increased translucency and improved smoking properties of the casing are believed to be due to the increased quantity of water absorbed by the casing. Upon treatment of the casing with Osage orange juice or a dilute aqueous solution of macin, there is a noticeable tendency for the casing to swell, accompanied by a marked increase in the amount of water absorbed by the casing. The percentage gain in weight of treated casings will vary from about two to four times the percentage gain in weight of untreated casings. The increase in the amount of water in the casing is probably the direct cause of the improved smoking properties. As is well known, smoke penetrates a wet surface more rapidly and to a greater extent than a dry surface, through which the smoke penetrates very slowly and only to a limited extent. Obviously, because of the absorption of greater amounts of water by the treated casing, the casing does not dry out as rapidly as an untreated casing, and this alteration of the property of the casing enables the use of a longer effective smoking period due to the more rapid and continued penetration of the smoke.

The treatment of natural casings in accordance with the invention also increases the stretchability of the casings and thereby increases the stuffing capacity of the casings. Upon stuffing treated and untreated casings under identical stuffing conditions, the diameter of the treated casings will be found to be greater than the untreated casings. The increase in stuffing capacity will, in general, vary from about 8% to about 15%, depending upon the characteristics of the casings, the concentration of Osage orange juice or macin solution used and upon the length of the period of treatment of the casings.

The treatment of the casings in accordance with the invention also renders the casings more slippery than conventionally treated casings. As is well known, casings, before stuffing, are placed upon or threaded on a stuffing horn, and it is desirable to have the casing as slippery as possible so that it may be easily threaded onto the stuffing horn. In conventional practice, a water connection is provided on the stuffing table and the operator places the casing over the water nozzle and admits a small amount of water prior to threading the casing upon the stuffing horn. Casings treated in accordance with the invention may be placed on a stuffing horn without first admitting a small amount of water into the casing, and this results in a substantial saving of time and water.

The treatment of casings in accordance with the invention also improves the dye absorbing properties of the casings. Dyeing of treated casings is far more rapid and requires much smaller quantities of dye to produce the same intensity of color as compared to the dyeing of untreated casings.

It will be understood that the proportions of Osage orange juice and water, the concentration of the macin solution and the temperatures and periods of treatment set forth herein may be varied within reasonable limits without departing from the spirit or scope of the invention.

I claim:

1. The process of improving the physical properties of animal tissue which comprises treating the tissue with macin.

2. The process of improving the physical properties of animal tissue which comprises treating the tissue with an aqueous solution of macin.

3. The process of tendering meat which comprises treating the meat with a dilute aqueous solution of macin.

4. The process of tendering meat which comprises pumping a dilute aqueous solution of macin through the vascular system thereof.

5. The process of treating meat which comprises pumping a dilute aqueous solution of macin through the vascular system thereof and carrying the meat under refrigeration until it is prepared for consumption.

6. The process of treating meat which comprises pumping Osage orange juice through the vascular system and holding the meat under refrigeration.

7. The process of improving the physical properties of natural casings which comprises treating the casing with a dilute solution of macin.

8. The process of improving the physical properties of natural casings which comprises spraying a dilute solution of macin upon the casing.

9. The process of improving the physical properties of sausages encased in natural casings which comprises treating the casing upon the sausage with a dilute aqueous solution of macin.

10. The process of tendering sausages encased in natural casings which comprises spraying a dilute solution of macin upon the surface of the casing and thereafter permitting the macin to tender the casing.

11. The process of improving the physical properties of natural casings which comprises treating the casings with Osage orange juice.

12. The process of improving the physical properties of natural casings which comprises spraying Osage orange juice upon the casing.

13. The process of improving the physical properties of natural casings which comprises applying a dilute solution of macin to the casing, heating the treated casing to a temperature between 60 degrees and 140 degrees F., maintaining the casing at such temperature for a sufficient length of time to permit the macin to attack the casing, and thereafter raising the temperature of the casing to destroy the major portion of the macin.

14. The process of tendering sausages encased in natural casings which comprises applying a dilute solution of macin to the casing, heating the treated casing to a temperature between 60 degrees and 140 degrees F., maintaining the casing at such temperature for a sufficient length of time to permit the macin to attack the casing, and thereafter raising the temperature of the casing to destroy the major portion of the macin.

15. The process of treating sausages encased in natural casings which are naturally tough which comprises washing the sausages, thereafter dipping them in a solution of fresh Osage orange juice, heating the treated casings to a temperature of between 60 degrees and 140 degrees F., maintaining the casing at such temperature for a period of approximately one and one-half hours, and thereafter cooking the sausages.

16. The process of treating sausages encased in natural casings which are naturally tough which comprises washing the sausages, thereafter dipping them in a dilute solution of macin, heating the treated casings to a temperature of between 60 degrees and 140 degrees F., maintaining the casing at such temperature for a period of approximately one and one-half hours, and thereafter cooking the sausages.

17. The method of accelerating the aging of animal tissue which comprises treating the tissue with macin.

18. The method of accelerating the aging of animal tissue which comprises treating the tissue with Osage orange juice.

19. The method of accelerating the aging of meat which comprises treating the meat with a solution of macin.

20. The method of accelerating the aging of meat which comprises pumping a dilute solution of macin through the vascular system of the meat and holding the meat under refrigeration.

JOHN M. RAMSBOTTOM.